(12) United States Patent
Berry et al.

(10) Patent No.: US 11,326,522 B1
(45) Date of Patent: *May 10, 2022

(54) MAGNETIC TURBOMACHINE SEALING ARRANGEMENT

(71) Applicant: General Electric Company, Schenectady, NY (US)

(72) Inventors: Jonathan Dwight Berry, Simpsonville, SC (US); Michael John Hughes, State College, PA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/136,131

(22) Filed: Dec. 29, 2020

(51) Int. Cl.
| | | |
|---|---|---|
| *F02C 7/00* | (2006.01) | |
| *F02C 7/28* | (2006.01) | |
| *F02C 3/04* | (2006.01) | |
| *F02C 7/18* | (2006.01) | |

(52) U.S. Cl.
CPC ............... *F02C 7/28* (2013.01); *F02C 3/04* (2013.01); *F02C 7/18* (2013.01); *F05D 2220/32* (2013.01); *F05D 2240/35* (2013.01); *F05D 2240/55* (2013.01)

(58) Field of Classification Search
None
See application file for complete search history.

(56) References Cited

U.S. PATENT DOCUMENTS

| | | | |
|---|---|---|---|
| 4,513,567 A | | 4/1985 | Deveau et al. |
| 6,142,477 A | * | 11/2000 | Meinzer ................ F01D 11/16 277/378 |
| 6,152,685 A | | 11/2000 | Hagi |
| 6,220,602 B1 | | 4/2001 | Webster et al. |
| 6,450,762 B1 | | 9/2002 | Munshi |
| 6,877,952 B2 | | 4/2005 | Wilson |
| 9,360,118 B2 | | 6/2016 | Fukuhara |
| 9,771,821 B1 | * | 9/2017 | Mills .................... F01D 11/025 |
| 11,187,091 B1 | * | 11/2021 | Berry ..................... F16J 15/43 |
| 2010/0327534 A1 | | 12/2010 | Powar et al. |
| 2017/0268360 A1 | * | 9/2017 | De La Bruere Terreault ............ F16J 15/54 |

FOREIGN PATENT DOCUMENTS

| | | |
|---|---|---|
| GB | 2108586 A | 5/1983 |
| JP | 3564286 B2 | 9/2004 |

* cited by examiner

*Primary Examiner* — Edwin Kang
(74) *Attorney, Agent, or Firm* — Dority & Manning, P.A.

(57) ABSTRACT

Sealing arrangements and turbomachines are provided. A sealing arrangement for a turbomachine includes a transition duct having an upstream end and a downstream end. The transition duct includes an aft frame that circumferentially surrounds the downstream end of the transition duct. A stage one nozzle spaced apart from the aft frame and defining a gap therebetween. A sealing assembly extends across the gap. The sealing assembly includes a first seal link magnetically coupled to the aft frame. The sealing assembly further includes a second seal link magnetically coupled to the first seal link and the stage one nozzle.

20 Claims, 5 Drawing Sheets

MAGNETIC TURBOMACHINE SEALING ARRANGEMENT

FIELD

The present disclosure relates generally to a sealing arrangement for a turbomachine. In particular, the present disclosure relates to an improved sealing arrangement between an aft frame and a stage one turbine nozzle.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of a gas turbine typically includes combustors that are coupled to a stage-one nozzle of the turbine section via transition ducts. Generally, each transition duct has an aft frame positioned adjacent to an inlet side of the turbine section. The aft frame will usually have two arcuate portions which are referred to as inner and outer portions, being inner and outer in the radial direction with respect to the centerline axis of the turbine. The inner and outer portions of the aft frame are interconnected by radially extending linear portions, often referred to as side portions. A sealing assembly is typically used to seal between the aft frame and the inlet of the turbine section. In particular, inner and outer circumferential seals are used to seal between the inner and outer portions of the aft frame and the corresponding inlet of the turbine section. Likewise, radially oriented side seals can be disposed between adjacent aft frames to substantially close and seal off the circumferential gaps between the side portion of one aft frame and the next aft frame.

The sealing assembly positioned about the aft frame generally functions to prevent high temperature combustion gases from being diluted with pressurized air surrounding the combustor prior to entrance into the turbine section. In this way, the sealing assembly ensures that the high temperature combustion gases are utilized fully in order to produce work within the turbine section.

However, issues exist with the use of many known sealing assemblies. For example, the high temperature of the combustion gases can cause damage to the sealing assembly over time, which may result in a limited life and decreased durability of the assembly. In addition, thermal expansion and vibrational movement of the aft frame and the stage one nozzle during operation of the gas turbine can cause the sealing assemblies to misalign and/or entirely decouple from, which results in an incomplete seal between the components.

Accordingly, an improved sealing assembly is desired in the art. In particular, an improved sealing assembly for a gas turbine engine that has increased durability and alignment, thereby prolonging the overall life and durability of the assembly, is desired.

BRIEF DESCRIPTION

Aspects and advantages of the sealing arrangements and turbomachines in accordance with the present disclosure will be set forth in part in the following description, or may be obvious from the description, or may be learned through practice of the technology.

In accordance with one embodiment, a sealing arrangement for a turbomachine is provided. The sealing arrangement includes a transition duct having an upstream end and a downstream end. The transition duct includes an aft frame that circumferentially surrounds the downstream end of the transition duct. A stage one nozzle spaced apart from the aft frame and defining a gap therebetween. A sealing assembly extends across the gap. The sealing assembly includes a first seal link magnetically coupled to the aft frame. The sealing assembly further includes a second seal link magnetically coupled to the first seal link and the stage one nozzle.

In accordance with another embodiment, a turbomachine is provided. The turbomachine includes a compressor section and a combustor section having a plurality of combustors. Each combustor comprising a transition duct having an upstream end and a downstream end. The transition duct includes an aft frame that circumferentially surrounds the downstream end of the transition duct. The turbomachine further includes a turbine section having a stage one nozzle spaced apart from the aft frame. A gap is defined between the stage one nozzle and the aft frame. A sealing assembly extends across the gap. The sealing assembly includes a first seal link magnetically coupled to the aft frame. The sealing assembly further includes a second seal link magnetically coupled to the first seal link and the stage one nozzle.

These and other features, aspects and advantages of the present sealing arrangements and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and turbomachines, including the best mode of making and using the present systems and methods, directed to one of ordinary skill in the art, is set forth in the specification, which makes reference to the appended figures, in which.

DETAILED DESCRIPTION

Figure 1:
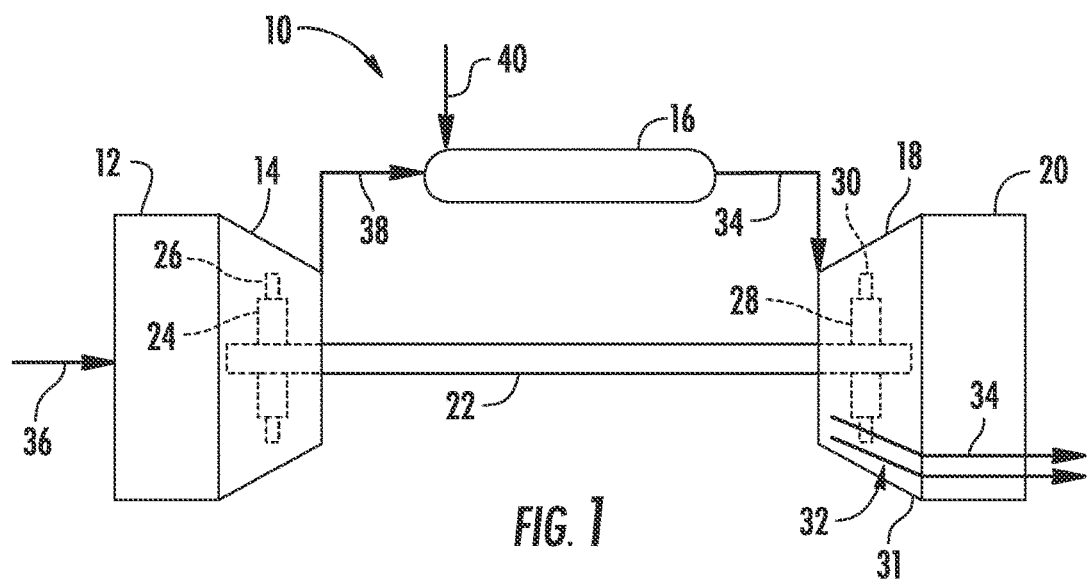
FIG. 1 is a schematic illustration of a turbomachine in accordance with embodiments of the present disclosure.

Reference now will be made in detail to embodiments of the present sealing arrangements and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another, and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 36 flows through the inlet section 12 and into the compressor section 14 where the air 36 is progressively compressed, thus providing pressurized air or compressed air 38 to the combustors 17 (FIG. 2) of the combustor section 16. The compressed air 38 is mixed with fuel 40 and burned within each combustor 17 (FIG. 2) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
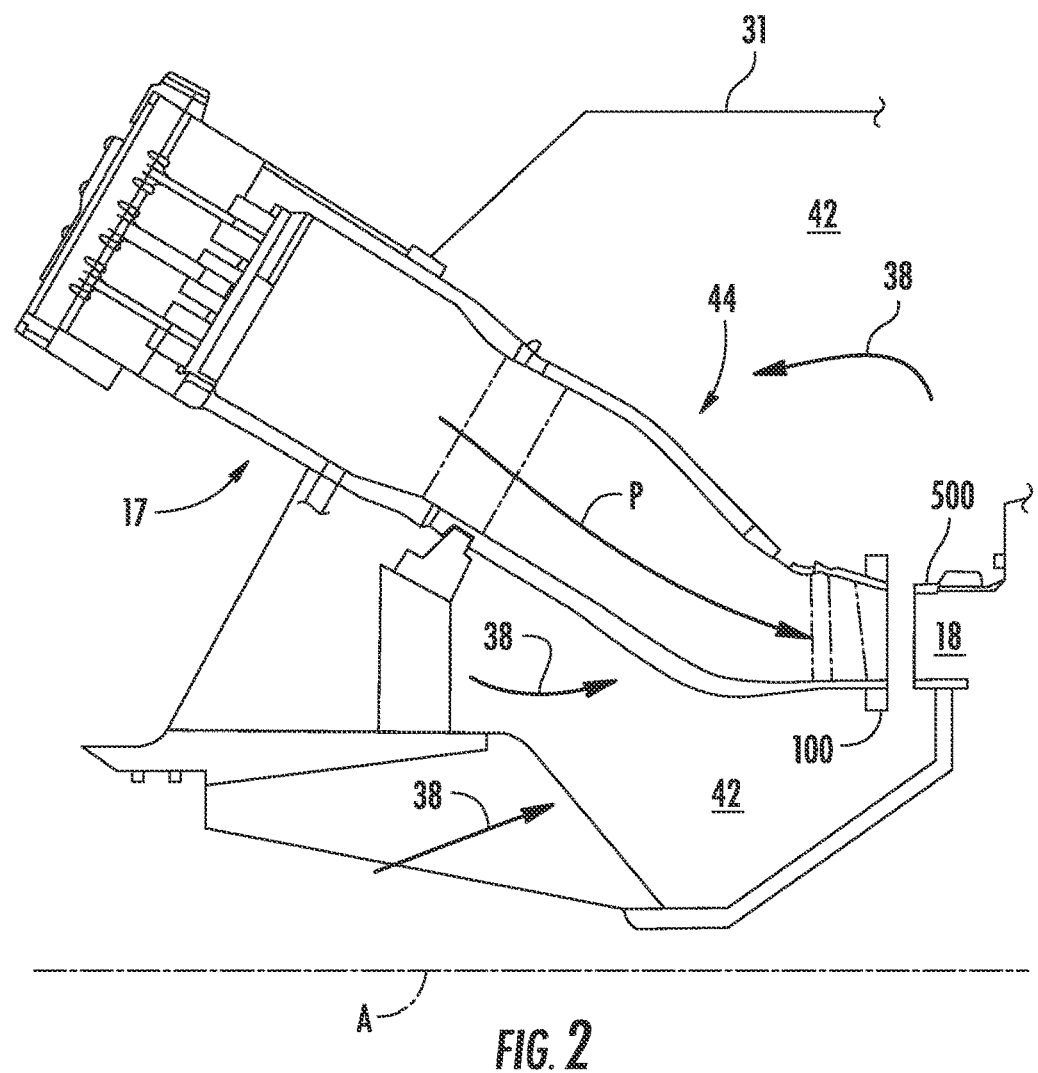
FIG. 2 illustrates a section view of a combustor in accordance with embodiments of the present disclosure.

As shown in FIG. 2, a combustor 17 may be at least partially surrounded by an outer casing 31 such as a compressor discharge casing. The outer casing 31 may at least partially define a high-pressure plenum 42 that at least partially surrounds various components of the combustor 17, such as transition duct 44. The high-pressure plenum 42 may be in fluid communication with the compressor 14 (FIG. 1) so as to receive the compressed air 38 therefrom. As illustrated in FIG. 2, the combustor 17 may be connected to a stage-one nozzle 700 of turbine 18 via a transition duct 44 including an aft frame 100. The transition duct 44 defines a flow path P. Also shown in FIG. 2 is the central axis A of turbine 18, which defines an axial direction substantially parallel to and/or along axis A, a radial direction R (FIG. 3) perpendicular to axis A, and a circumferential direction C (FIG. 3) extending around axis A.

Figure 3:
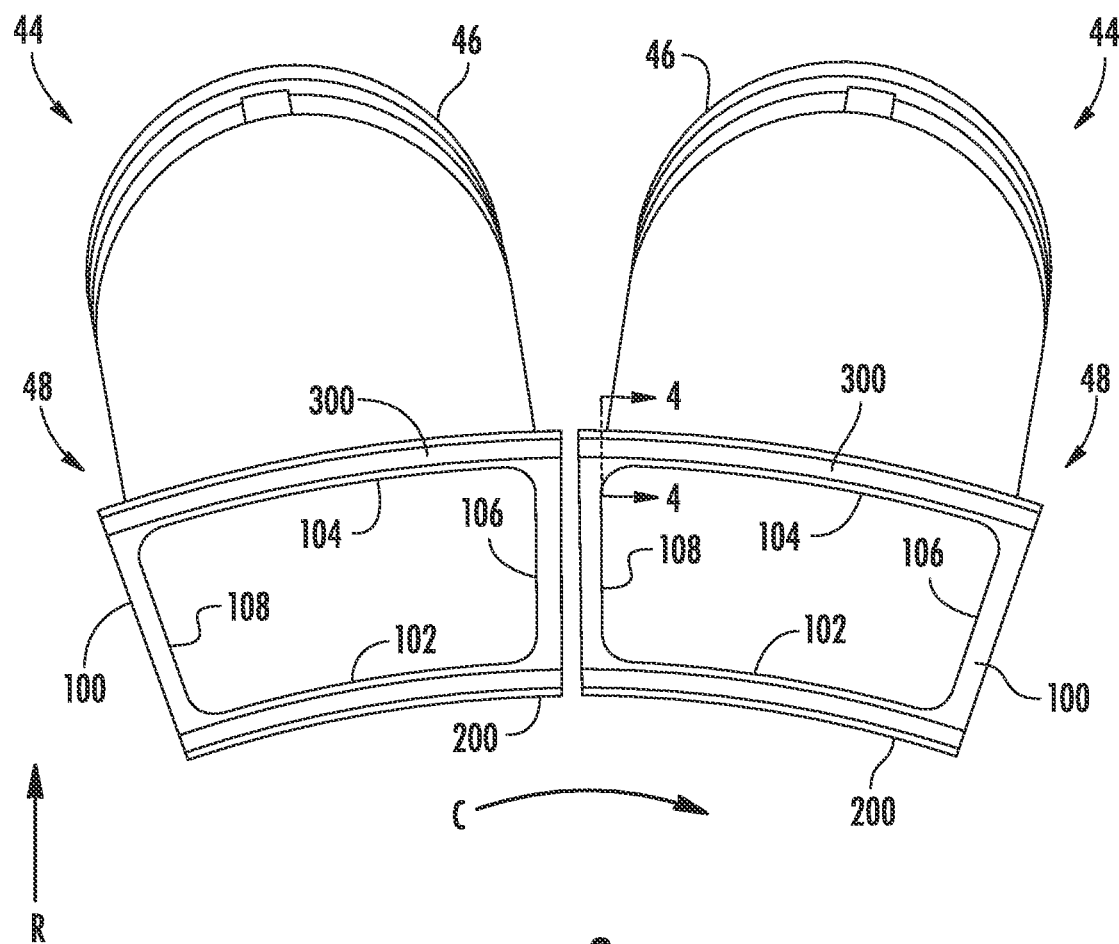
FIG. 3 illustrates a perspective view of circumferentially adjacent transition ducts in accordance with embodiments of the present disclosure.
Figure 4:
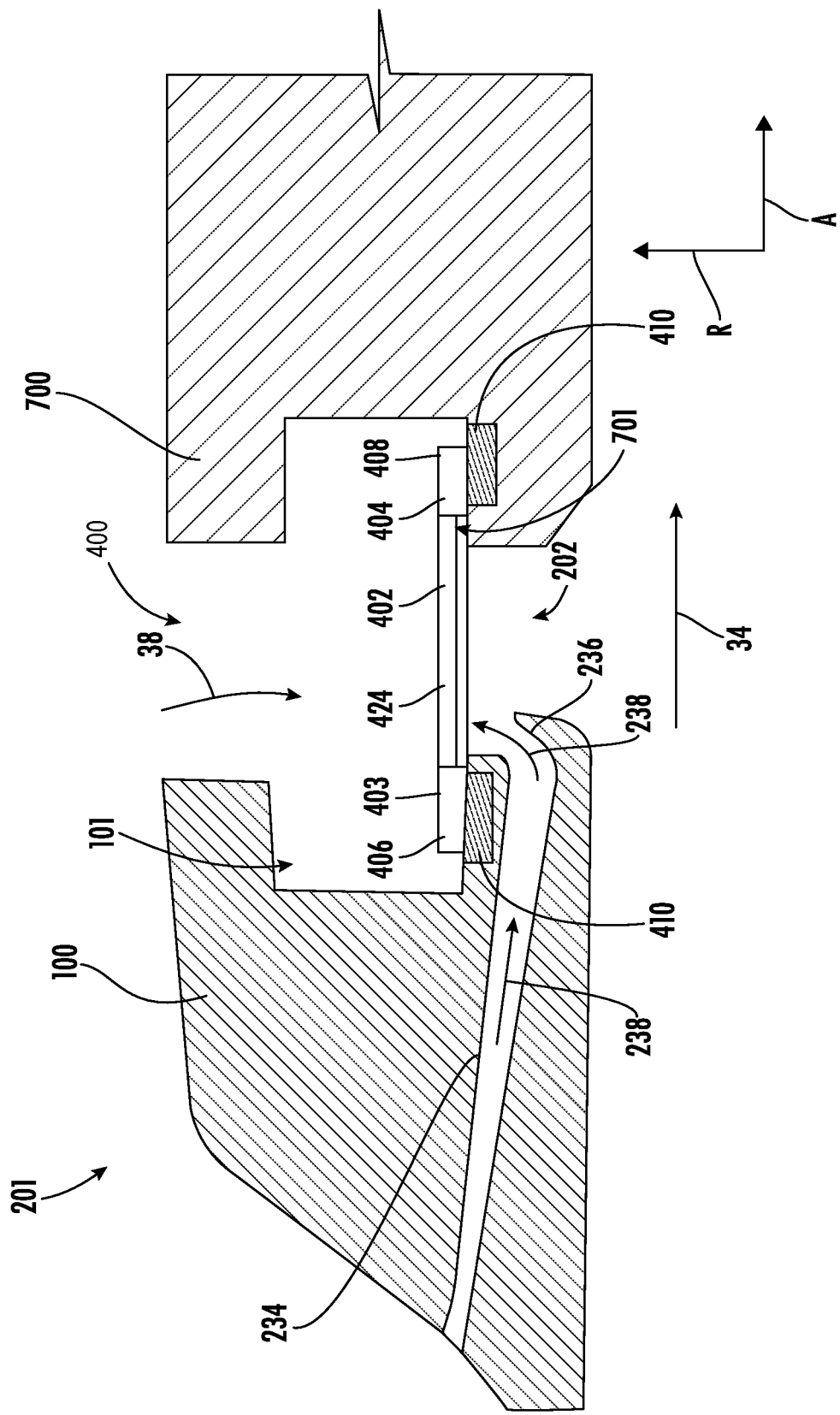
FIG. 4 illustrates a cross sectional perspective view of a sealing arrangement in accordance with embodiments of the present disclosure.

Referring now to FIG. 3, a pair of circumferentially arranged transition ducts 44 are illustrated, each having an upstream end 46 and a downstream end 48. As shown, an aft frame 100 surrounds the respective downstream end 48 of the transition ducts 44. As illustrated in FIG. 3, in some embodiments, the aft frame 100 may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. Aft frame 100 may include a notch or slot 101 (as shown in FIG. 4) for partially receiving inner seal 200 and/or outer seal 300. In some embodiments, a notch 101 may extend fully around the perimeter of the aft frame 100 (e.g., notch 110 may be continuous through the side portions 106 and 108 and the inner and the outer portions 102 and 104) for receiving both inner seal 200 and outer seal 300 as well as a radially-oriented side seal (not shown) which may be provided between adjacent aft frames 100. It is also possible in some embodiments to provide separate slots or notches for each of the seals 200 and 300.

As shown in FIG. 3, inner seal 200 and outer seal 300 may be circumferentially oriented with respect to a circumferential direction C of the gas turbine 10. For example, each inner seal 200 is circumferentially aligned with the other inner seal 200 on the adjacent aft frame 100, and each outer seal 300 is circumferentially aligned with the other outer seal 300 on the adjacent aft frame 100. Thus, inner seals 200 and outer seals 300 may be collectively referred to as circumferentially oriented seals.

In the description herein, certain features of the aft frame 100, stage-one nozzle 700, and seals, 200 and 300, will be described with reference to one or the other of inner portion 102/inner seal 200 and outer portion 104/outer seal 300, nonetheless, it will be recognized by one of ordinary skill in the art that such features can be associated with either or both of inner portions 102 and/or outer portions 104.

Figure 5:
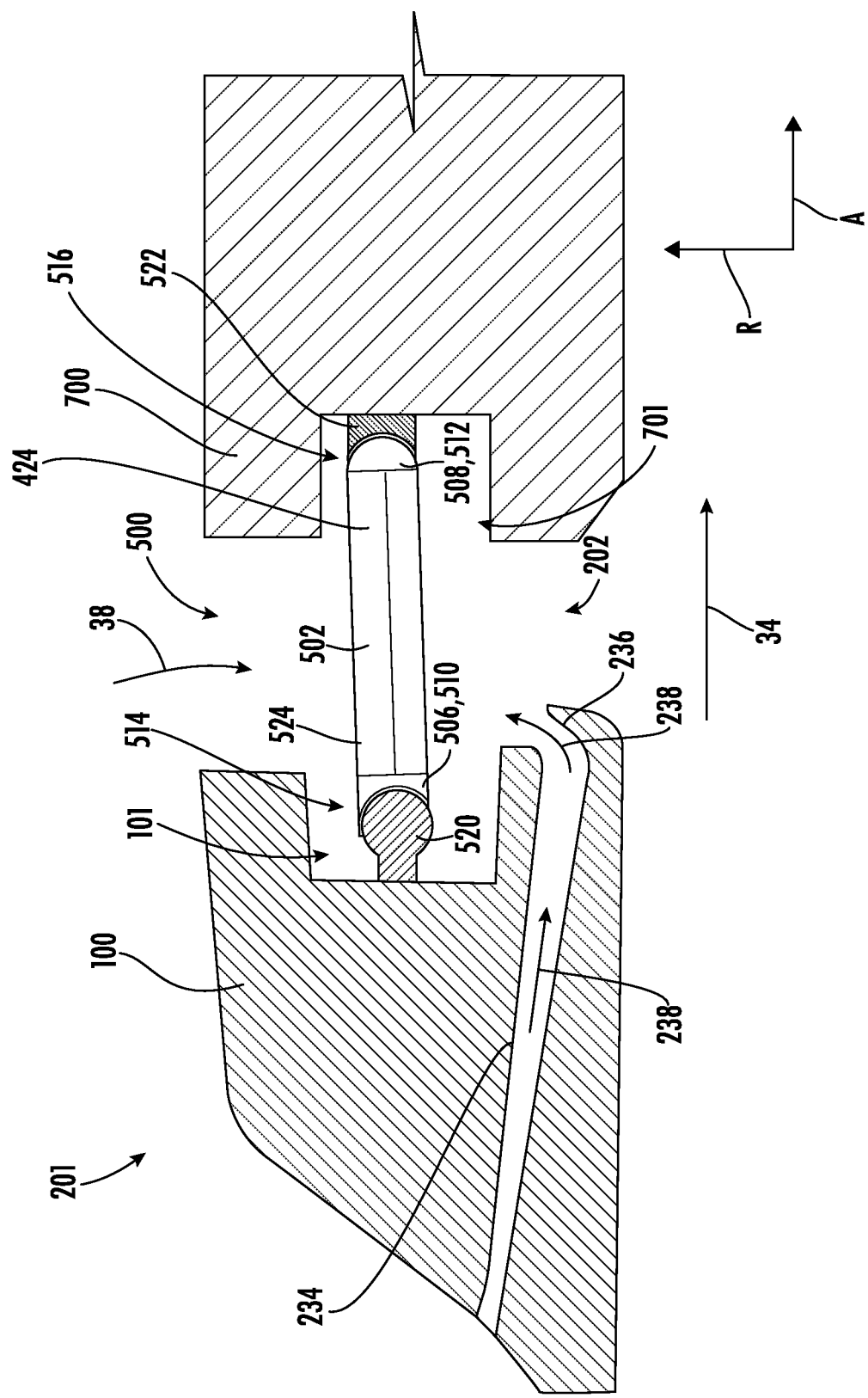
FIG. 5 illustrates a cross sectional perspective view of a sealing arrangement in accordance with embodiments of the present disclosure.
Figure 6:
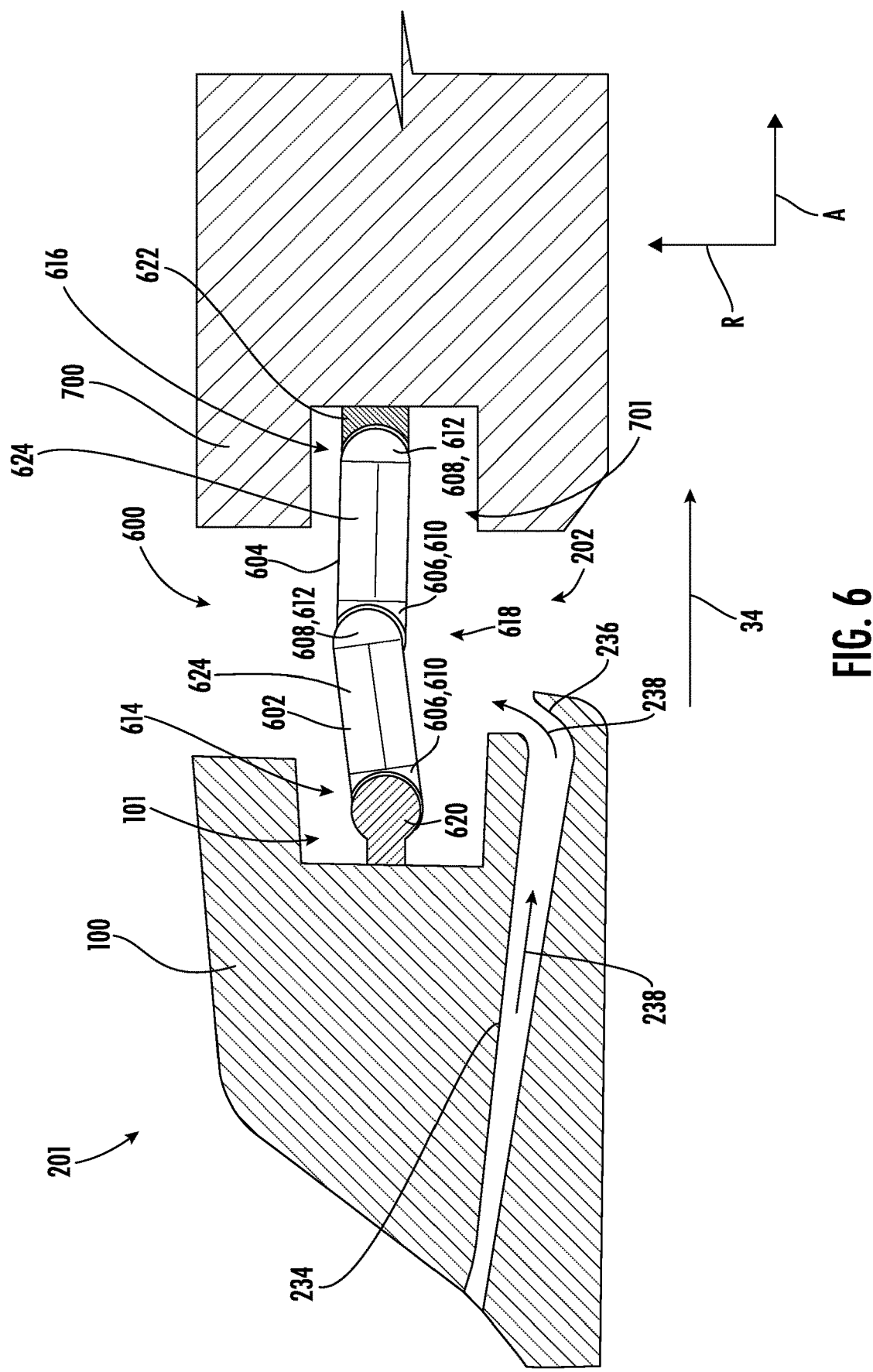
FIG. 6 illustrates a cross sectional perspective view of a sealing arrangement in accordance with embodiments of the present disclosure.

FIGS. 4-6 illustrate cross-sectional views of sealing arrangements 201 in accordance with embodiments of the present disclosure. For example, FIG. 4 illustrates a cross sectional view of a sealing arrangement 201 having a sealing assembly 400, FIG. 5 illustrates a cross sectional view of a sealing arrangement 201 having a sealing assembly 500, and FIG. 6 illustrates a cross sectional view of a sealing arrangement 201 having a sealing assembly 600. The sealing assemblies 400, 500, and 600 described herein may be representative of either an inner seal 200, an outer seal 300, or both. As shown in FIGS. 4-6, the sealing arrangement 201 includes a transition duct 44 having an upstream end 46 and a downstream end 48 (As shown in FIG. 3). In many embodiments, an aft frame 100 circumferentially surrounds the downstream end 48 of the transition duct 44. A stage one nozzle 700 of turbine 18 may be spaced apart from the aft frame 100 and may define a gap 202 between the stage one nozzle 700 and the aft frame 100. Specifically, the stage one nozzle 700 and the aft frame 100 may be axially spaced apart to allow for movement and/or thermal expansion of the stage one nozzle 700 and/or the aft frame 100 during operation of the gas turbine 10. The gap 202 may be defined axially between an aft face 204 of the aft frame 100 and a forward face 206 of the stage one nozzle 700.

As shown in FIG. 4-6, the aft frame 100 may define a first slot 101 that extends axially and circumferentially within the aft frame 100 with respect to the axial centerline of the gas turbine 10. Similarly, the stage one nozzle 700 may define a second slot 701 that extends axially and circumferentially within the stage one nozzle 700 with respect to the axial centerline of the gas turbine 10. The sealing assemblies 400, 500, and 600 may be partially disposed within the first slot 101 and the second slot 701, which advantageously shields the sealing assemblies 400, 500, and 600 from the high temperature combustion gases 34.

As shown in FIG. 4, the sealing arrangement 201 may include a sealing assembly 400 that extends across the gap 202, in order to prevent combustion gases 34 exiting the transition duct 44 from being diluted with the pressurized air 38 from the high-pressure plenum 42. As shown, the sealing assembly 400 may include a seal link 402 that extends across the gap 202. The seal link 402 may be magnetically coupled to the aft frame 100 at an upstream end 406 and magnetically coupled to the stage one nozzle 700 at a downstream end 408. For example, the seal link 402 may include a first magnet end 403 at the upstream end 406 that magnetically couples to the aft frame 100 and a second magnet end 404 that magnetically couples to the stage one nozzle 700. In various embodiments, the magnet ends 403, 404 may be in the form of a piece of metal material that has its component atoms so ordered that the material exhibits properties of magnetism, such as attracting other iron-containing objects or aligning itself in an external magnetic field. In exemplary embodiments, the magnet ends 403, 404 may be Alnico magnets, such that they are permanent magnets that are primarily made up of a combination of aluminum, nickel, and cobalt but may also include copper, iron and titanium. Alnico magnets may be capable of operation in extremely high temperatures, such as upwards of 1000° F.

In some embodiments, the aft frame 100 and/or the stage one nozzle 700 may be formed of a ferrous (or iron containing) metal, such that the aft frame 100 and/or the stage one nozzle 700 are attracted to the magnetic ends 403, 404 and coupled thereto. In other embodiments, the aft frame 100 and/or the stage one nozzle 700 may be formed of a non-ferrous metal. In such embodiments, one or more magnets 410 may be embedded within the aft frame 100 and the stage one nozzle 700, in order to create an attractive magnetic force between the magnets 410 and the magnet ends 403, 404 of the seal link 402. In the embodiment shown in FIG. 4, the seal link 402 may be sealed against the aft frame 100 and the stage one nozzle 700 via a pressure load imparted by the pressurized air 38. Further, the seal link 402 may be sealed against the aft frame 100 and the stage one nozzle 700 via an attractive magnetic force.

As shown in FIG. 4, the seal link 402 may include a flexible sealing element 424 that extends between the upstream end 406 and the downstream end 408. The flexible sealing element 424 may be composed primarily of a cloth material, which can be a woven mesh cloth of a suitable metal material, e.g., alloy L605. The materials of the flexible sealing element 424 may be layered, e.g., a single sheet of cloth material may be folded over on itself as illustrated in FIG. 4, and/or multiple layers of cloth material may be welded together.

As shown in FIG. 5, the sealing arrangement 201 may include a sealing assembly 500 that extends across the gap 202, in order to prevent combustion gases 34 exiting the transition duct 44 from being diluted with the pressurized air 38 from the high-pressure plenum 42. As shown, the sealing assembly 400 may include a seal link 502 that extends across the gap 202. The seal link 502 may be magnetically coupled to the aft frame 100 at an upstream end 506 and magnetically coupled to the stage one nozzle 700 at a downstream end 508. As shown, the upstream end 506 of the seal link 502 may include one of a convex magnet end 512 or a concave magnet end 510. Similarly, the downstream end 508 of the seal link 502 may include one of the convex magnet end 512 or the concave magnet end 510. The convex magnet end 512 may be in the form of a protrusion, ball, or generally rounded axially outward surface that is configured to rotatably and magnetically couple to one of the aft frame 100 or the stage one nozzle 700. Likewise, the concave magnet end 510 may be in the form of an indentation, socket, or generally rounded axially inward surface that is configured to rotatably and magnetically couple to one of the aft frame 100 or the stage one nozzle 700. For example, as shown in FIG. 5, the convex magnet end 512 of the seal link 502 is rotatably and magnetically coupled to the stage one nozzle 700 and the concave magnet end 510 is rotatably and magnetically coupled to the aft frame 100.

As shown in FIG. 5, the sealing arrangement may include a first magnetic ball socket joint 514 and a second magnetic ball socket joint 516. As shown, the upstream end 506 of the seal link 502 may be coupled to the aft frame 100 via the first magnetic ball socket joint 514. In particular embodiments, as shown, the downstream end 608 of the seal link 502 may couple to the stage one nozzle 700 via the second magnetic ball socket joint 516.

In various embodiments, the aft frame may include one of a ball magnet 520 or a socket magnet 522 configured to rotatably and magnetically couple to the upstream end 506 of the seal link 502. For example, in the embodiment shown in FIG. 5, the aft frame 100 includes a ball magnet 520 fixedly coupled to the aft frame 100, and the seal link 502 includes the corresponding concave magnet end 510 in order to couple to the ball magnet 520 of the aft frame 100 and form the first magnetic ball socket joint 514. However, in other embodiments (not shown), the aft frame 100 may include a socket magnet. In such embodiments, the seal link 502 may include a corresponding convex seal end in order to couple to the socket magnet of the aft frame 100.

Similarly, the stage one nozzle 700 may include one of a ball magnet 520 or a socket magnet 522 configured to rotatably and magnetically couple to the downstream end 508 of the seal link 502. For example, in the embodiment shown in FIG. 5, the stage one nozzle 700 includes a socket magnet 522 fixedly coupled to the stage one nozzle 700, and the seal link 502 includes the corresponding convex magnet end 512 in order to couple to the socket magnet 522 of the stage one nozzle 700 and form the second magnetic ball socket joint 516. However, in other embodiments (not shown), the stage one nozzle 700 may include a ball magnet. In such embodiments, the seal link 502 may include a corresponding concave seal end in order to couple to the ball magnet of the stage one nozzle 700.

Although the ball socket joints 514, 516 depicted in FIG. 5 show sockets or concave magnet ends 510 disposed on the upstream end 506 of the seal link 502, and balls or convex magnet ends 512 disposed on the downstream end 508 of the seal link 502, it is envisioned to be within the scope of the present disclosure that one or more of the balls or convex magnet ends be installed on the upstream end 506, and the corresponding socket(s) or concave magnet ends be disposed on the downstream end 508.

In many embodiments, the seal link 502 may include a flexible sealing element 524 that extends between the upstream end 506 and the downstream end 508. The flexible sealing element 524 may be composed primarily of a cloth material, which can be a woven mesh cloth of a suitable metal material, e.g., alloy L605. The materials of the flexible sealing element 524 may be layered, e.g., a single sheet of cloth material may be folded over on itself as illustrated in FIG. 5, and/or multiple layers of cloth material may be welded together.

As shown in FIG. 6, the sealing assembly 600 may include a first seal link 602 and a second seal link 604. The first seal link 602 may be magnetically coupled to the aft frame 100 and may extend generally axially towards the stage one nozzle 700. Similarly, the second seal link 604 may be magnetically coupled to the stage one nozzle 700 and may extend generally axially towards the aft frame 100. In exemplary embodiments, the first link 602 and the second link 604 may be magnetically coupled to one another between the aft frame 100 and the stage one nozzle 700, e.g., within the gap 202. In this way, the first seal link 602 and the second seal link may extend towards one another and magnetically couple together at a location within the gap 202.

In many embodiments, the first seal link 602 may be rotatable relative the aft frame 100. Similarly, the second seal link 604 may be rotatable relative the stage one nozzle 700. In various embodiments, the first seal link 602 and the second seal link 604 are each rotatable relative to each other. For example, the first seal link 602 and the second seal link 604 may be rotatable at their respective points of attachment, which advantageously allows for thermal expansion and relative movement between the aft frame 100 and the stage one nozzle 700 without causing the sealing assembly 00 to misalign and/or entirely decouple.

In particular embodiments, the first seal link 602 and the second seal link 604 may each extend between a respective upstream end 606 and a respective downstream end 608. In various embodiments, the respective upstream end 606 of the seal links 602, 604 may include one of a convex magnet end 612 or a concave magnet end 610. Similarly, the downstream end 608 of the seal links 602, 604 may include one of the convex magnet end 612 or the concave magnet end 610. The convex magnet end 612 may be in the form of a protrusion, ball, or generally rounded axially outward surface that is configured to rotatably and magnetically couple to a corresponding concave magnet end 610 of a neighboring seal link. Likewise, the concave magnet end 610 may be in the form of an indentation, socket, or generally rounded axially inward surface that is configured to rotatably and magnetically couple to a corresponding convex magnet end 612 of a neighboring seal link. For example, as shown in FIG. 6, the convex magnet end 612 of the first seal link 602 may rotatably and magnetically couple to the concave magnet end 610 of the second magnet 604.

As shown in FIG. 6, the sealing arrangement may include a first magnetic ball socket joint 614, a second magnetic ball socket joint 616, and a third magnetic ball socket joint 618. As shown, upstream end 606 of the first seal link 602 may be coupled to the aft frame 100 via the first magnetic ball socket joint 614. In many embodiments, the downstream end 608 of the first seal link 602 may be coupled to the upstream end 606 of the second seal link 604 via the second magnetic ball socket joint 616. In particular embodiments, as shown, the downstream end 608 of the second seal link 604 may couple to the stage one nozzle 700 via the third magnetic ball socket joint 618.

In various embodiments, the aft frame may include one of a ball magnet 620 or a socket magnet 622 configured to rotatably and magnetically couple to the upstream end 606 of the first seal link 602. For example, in the embodiment shown in FIG. 6, the aft frame 100 includes a ball magnet 620 fixedly coupled to the aft frame 100, and the first seal link 602 includes the corresponding concave magnet end 612 in order to couple to the ball magnet 620 of the aft frame 100 and form the first magnetic ball socket joint 614. However, in other embodiments (not shown), the aft frame 100 may include a socket magnet. In such embodiments, the first seal link 602 may include a corresponding convex seal end in order to couple to the socket magnet of the aft frame 100.

Similarly, the stage one nozzle 700 may include one of a ball magnet 620 or a socket magnet 622 configured to rotatably and magnetically couple to the downstream end 608 of the second seal link 604. For example, in the embodiment shown in FIG. 6, the stage one nozzle 700 includes a socket magnet 622 fixedly coupled to the stage one nozzle 700, and the second seal link 604 includes the corresponding concave magnet end 612 in order to couple to the socket magnet 622 of the stage one nozzle and form the third magnetic ball socket joint 618. However, in other embodiments (not shown), the stage one nozzle 700 may include a ball magnet. In such embodiments, the second seal link 604 may include a corresponding concave seal end in order to couple to the ball magnet of the stage one nozzle 700.

Although the ball socket joints 614, 616, 618 depicted in FIG. 6 shows sockets or concave magnet ends 610 disposed on the upstream end 606 of the first seal link 602 and the second seal link 604, and balls or convex magnet ends 612 disposed on the downstream end 608 of the first seal link 602 and the second seal link 604, it is envisioned to be within the scope of the present disclosure that one or more of the balls or convex magnet ends be installed on the upstream end 606, and the corresponding socket(s) or concave magnet ends be disposed on the downstream end 608.

In many embodiments, each of the first seal link 602 and the second seal link 604 may include a flexible sealing element 624 that extends between the respective upstream end 606 and the respective downstream end 608. The flexible sealing element 624 may be composed primarily of a cloth material, which can be a woven mesh cloth of a suitable metal material, e.g., alloy L605. The materials of the flexible sealing element 624 may be layered, e.g., a single sheet of cloth material may be folded over on itself as illustrated in FIG. 6, and/or multiple layers of cloth material may be welded together.

As shown in FIG. 4-6, the aft frame 100 may define a first slot 101 that extends axially and circumferentially within the aft frame 100 with respect to the axial centerline of the gas turbine 10. Similarly, the stage one nozzle 700 may define a second slot 701 that extends axially and circumferentially within the stage one nozzle 700 with respect to the axial centerline of the gas turbine 10. In many embodiments, at least a portion of the first seal link 602 extends into the first slot 101 defined by the aft frame 100, which advantageously shields the first seal link 602 from the high temperature combustion gases 34. Likewise, at least a portion of the second seal link 604 may extend into the second slot 701 defined by the stage one nozzle 700, which advantageously shields the second seal link 604 from the high temperature combustion gases 34.

As shown in FIG. 4-6, the aft frame 100 may define a cooling channel 234 that functions to cool various components of the sealing arrangement 201. As shown, the cooling channel 234 may extend along the aft frame 100. In many embodiments, the cooling channel 234 may diverge radially inward with respect to the axial centerline A of the gas turbine 10 in the direction of combustion gas 34 flow within the aft frame 100 (from upstream end to downstream end). The cooling channel 234 may further include an outlet 236. The outlet 236 may be oriented generally radially, in order to direct a flow of cooling air 238 towards the sealing assembly 400, 500, 600. The flow of cooling air 238 may provide for impingement cooling to the various components of the sealing assembly 400, 500, 600. The flow of cooling air 238 may ensure that the various magnets within the sealing assemblies 400, 500, 600 maintain an operable temperature, i.e., ensure that the magnets do not overheat.

In many embodiments, the sealing assemblies 400, 500, and 600 described herein may extend continuously in the circumferential direction C (into and out of the page in FIGS. 4-6). In this way, the ball socket joints described herein may each extend continuously in the circumferential direction C. In other embodiments, the ball socket joints may be a plurality of ball socket joints circumferentially spaced apart from one another.

In operation, combustion gases 34 may exit the combustor 17 via the aft frame 100 and have to traverse across the gap 202 prior to entrance into the turbine section 18 via the stage one nozzle 700. The sealing assemblies 400, 500, and 600 described herein may ensure that the combustion gases 34 are not diluted with pressurized air 38 prior to entering the turbine section. In this way, the sealing assembly 400 ensures that all of the thermal energy from the combustion gases 34 gets utilized by the turbine section 18, thereby maintaining the high operating efficiency of the turbomachine. The magnetic ball socket joints 614, 616, 618 described herein may advantageously provide for relative movement between the seal links 602, 602 while maintaining proper alignment of the entire sealing assembly 600. For example, during operation of the turbomachine, the aft frame 100 and the stage one nozzle 700 may move relative to one another due to thermal expansion and/or general operational vibrations. The sealing assembly 600 described herein is capable of moving and rotating along with the aft frame 100 and stage one nozzle 700, while the magnets ensure that the sealing assembly 600 maintains alignment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for a turbomachine, comprising:
   a transition duct having an upstream end and a downstream end, the transition duct comprising an aft frame that circumferentially surrounds the downstream end of the transition duct;
   a stage one nozzle spaced apart from the aft frame and defining a gap therebetween; and
   a sealing assembly extending across the gap, the sealing assembly comprising:
   a seal link magnetically coupled to the aft frame at an upstream end of the seal link and magnetically coupled to the stage one nozzle at a downstream end of the seal link.

2. The sealing arrangement as in claim 1, wherein the upstream end of the seal link is coupled to the aft frame via a first magnetic ball socket joint, and wherein the downstream end of the seal link is coupled to the stage one nozzle via a second magnetic ball socket joint.

3. The sealing arrangement as in claim 1, wherein the aft frame includes one of a ball magnet or a socket magnet configured to rotatably and magnetically couple to the upstream end of the seal link.

4. The sealing arrangement as in claim 1, wherein the stage one nozzle includes one of a ball magnet or a socket magnet configured to rotatably and magnetically couple to the downstream end of the seal link.

5. The sealing arrangement as in claim 2, wherein the upstream end of the seal link includes one of a convex magnet end or a concave magnet end and the downstream end of the seal link includes one of a convex magnet end or a concave magnet end.

6. The sealing arrangement as in claim 1, wherein the seal link is a first seal link, the upstream end of the seal link is a respective upstream end of the first seal link and the downstream end of the seal link is a respective downstream end of the first seal link, wherein the sealing assembly further comprises a second seal link magnetically coupled to the first seal link, wherein the second seal link comprises a respective upstream end of the second seal link and a respective downstream end of the second seal link, and wherein the first seal link and the second seal link each extend between the respective upstream end of the first seal link and the second seal link, respectively, having one of a convex magnet end or a concave magnet end and the respective downstream end of the first seal link and the second seal link, respectively, having one of a convex magnet end or a concave magnet end.

7. The sealing arrangement as in claim 6, wherein the respective upstream end of the first seal link is magnetically coupled to the aft frame via a first magnetic ball socket joint, the respective downstream end of the second seal link is coupled to the stage one nozzle via a second magnetic ball socket joint, and the respective downstream end of the first seal link is coupled to the respective upstream end of the second seal link via a third magnetic ball socket joint.

8. The sealing arrangement as in claim 6, wherein the first seal link is rotatable relative to the aft frame, wherein the second seal link is rotatable relative to the stage one nozzle, and wherein the first seal link and the second seal link are each rotatable relative to each other.

9. The sealing arrangement as in claim 1, wherein the seal link comprises a flexible sealing element extending between the upstream end of the seal link and the downstream end of the seal link.

10. The sealing arrangement as in claim 1, wherein a cooling flow channel is defined within the aft frame, and wherein the cooling flow channel directs cooling air exiting an outlet towards the sealing assembly to provide impingement cooling thereto.

11. A turbomachine, comprising:
a compressor section;
a combustor section having a plurality of combustors, each combustor comprising a transition duct having an upstream end and a downstream end, the transition duct comprising an aft frame that circumferentially surrounds the downstream end of the transition duct;
a turbine section having a stage one nozzle spaced apart from the aft frame, wherein a gap is defined between the stage one nozzle and the aft frame; and
a sealing assembly extending across the gap, the sealing assembly comprising:
a seal link magnetically coupled to the aft frame at an upstream end of the seal link and magnetically coupled to the stage one nozzle at a downstream end of the seal link.

12. The turbomachine as in claim 11, wherein the upstream end of the seal link is coupled to the aft frame via a first magnetic ball socket joint, and wherein the downstream end of the seal link is coupled to the stage one nozzle via a second magnetic ball socket joint.

13. The turbomachine as in claim 11, wherein the aft frame includes one of a ball magnet or a socket magnet configured to rotatably and magnetically couple to the upstream end of the seal link.

14. The turbomachine as in claim 11, wherein the stage one nozzle includes one of a ball magnet or a socket magnet configured to rotatably and magnetically couple to the downstream end of the seal link.

15. The turbomachine as in claim 12, wherein the upstream end of the seal link includes one of a convex magnet end or a concave magnet end and the downstream end of the seal link includes one of a convex magnet end or a concave magnet end.

16. The turbomachine as in claim 11, wherein the seal link is a first seal link, the upstream end of the seal link is a respective upstream end of the first seal link and the downstream end of the seal link is a respective downstream end of the first seal link, wherein the sealing assembly further comprises a second seal link magnetically coupled to the first seal link, wherein the second seal link comprises a respective upstream end of the second seal link and a respective downstream end of the second seal link, and wherein the first seal link and the second seal link each extend between the respective upstream end of the first seal link and the second seal link, respectively, having one of a convex magnet end or a concave magnet end and the respective downstream end of the first seal link and the second seal link, respectively, having one of a convex magnet end or a concave magnet end.

17. The turbomachine as in claim 16, wherein the respective upstream end of the first seal link is magnetically coupled to the aft frame via a first magnetic ball socket joint, the respective downstream end of the second seal link is coupled to the stage one nozzle via a second magnetic ball socket joint, and the respective downstream end of the first seal link is coupled to the respective upstream end of the second seal link via a third magnetic ball socket joint.

18. The turbomachine as in claim 16, wherein the first seal link is rotatable relative to the aft frame, wherein the second seal link is rotatable relative to the stage one nozzle, and wherein the first seal link and the second seal link are each rotatable relative to each other.

19. The turbomachine as in claim 11, wherein the seal link comprises a flexible sealing element extending between the upstream end of the seal link and the downstream end of the seal link.

20. The turbomachine as in claim 11, wherein a cooling flow channel is defined within the aft frame, and wherein the cooling flow channel directs cooling air exiting an outlet towards the sealing assembly to provide impingement cooling thereto.

* * * * *